United States Patent [19]

Devendorf et al.

[11] Patent Number: 5,311,190
[45] Date of Patent: May 10, 1994

[54] TRANSMIT AND RECEIVE ANTENNA ELEMENT WITH FEEDBACK

[75] Inventors: Don C. Devendorf, Carlsbad; Edwin A. Kelley, Los Angeles; Roy S. Komori, Rancho Palos Verdes, all of Calif.

[73] Assignee: Hughes Aircraft Company, Los Angeles, Calif.

[21] Appl. No.: 994,845

[22] Filed: Dec. 22, 1992

[51] Int. Cl.$^5$ .............................................. G01S 7/03
[52] U.S. Cl. ...................................... 342/157; 342/103
[58] Field of Search ................................... 342/103, 157

[56] References Cited

U.S. PATENT DOCUMENTS 3,611,381 10/1971 Preikschat ...................... 342/157 X Primary Examiner—T. H. Tubbesing
Attorney, Agent, or Firm—L. A. Alkov; W. K. Denson-Low

[57] ABSTRACT

A transmit/receive element having a transmit/receive circuit that includes a variable frequency transmit phase lock loop and a variable frequency receive phase lock loop, and an output amplifier that receives a modulated transmit signal from the transmit phase lock loop for driving an antenna element. The transmit phase lock loop receives a feedback signal which is (a) the modulated transmit signal during receive intervals and (b) the output of the output amplifier during transmit intervals, such that the transmit phase lock loop is controlled by a feedback signal at all times.

3 Claims, 1 Drawing Sheet

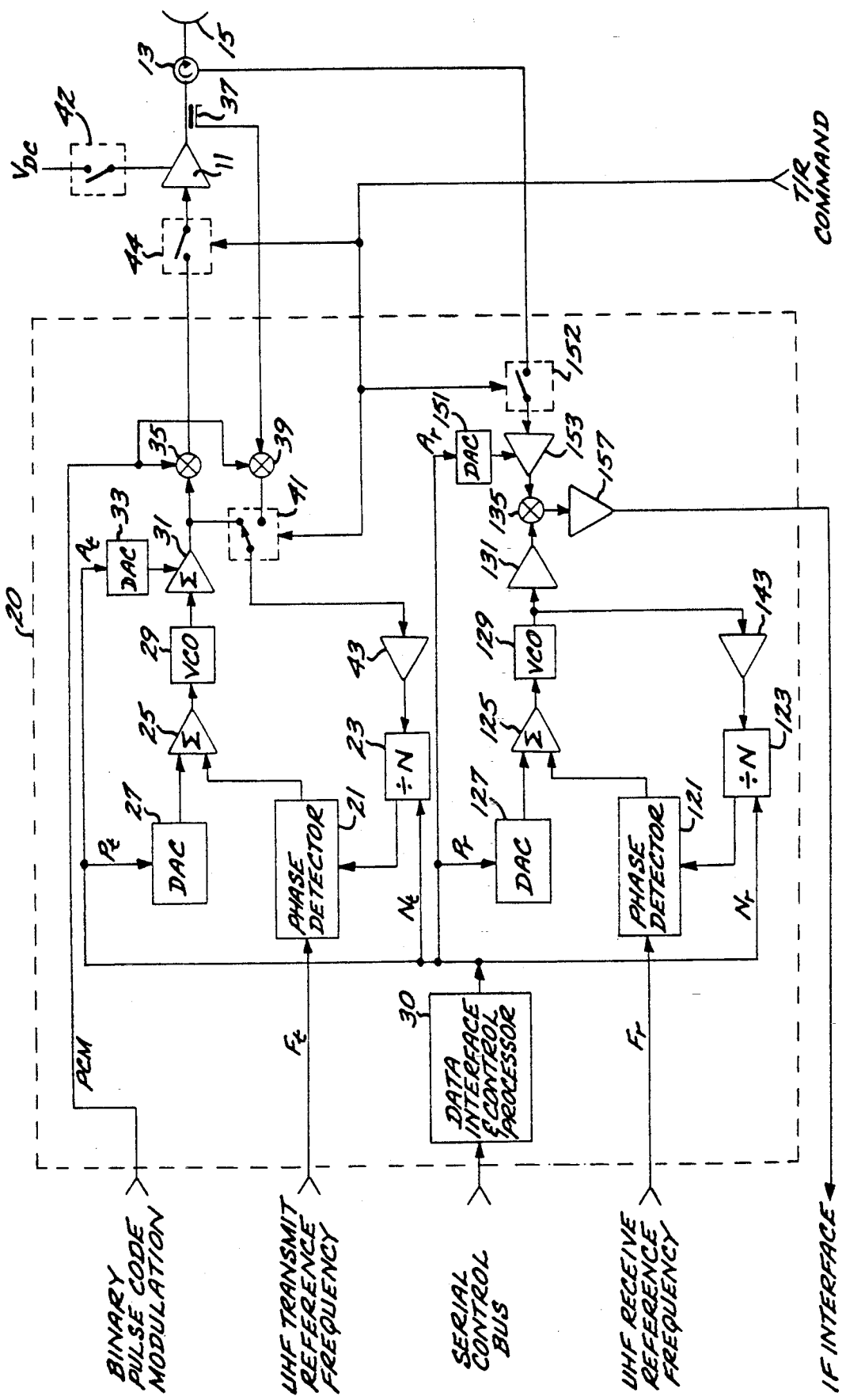

TRANSMIT AND RECEIVE ANTENNA ELEMENT WITH FEEDBACK

BACKGROUND OF THE INVENTION

The disclosed invention is directed generally to transmit/receive circuits for active array antennas, and is directed more particularly to a closed loop transmit/receive circuit.

An active antenna array is a directive antenna system comprising, for example, individual antenna elements whose antenna beam direction (i.e., pointing direction) is controlled by the relative phases of the signals respectively radiated or received by the antenna elements. In particular, for transmission, the relative phases of the energy radiated by the individual antenna elements is controlled to define the transmit beam direction of the antenna. For receiving, the relative phases of the energy received by the individual elements is controlled to define the receive beam direction of the antenna. Associated with each antenna element is a transmit/receive circuit that typically includes (a) a transmit channel having a gated transmit RF power amplifier and an associated phase shifter, and (b) a receive channel having a low noise receive amplifier and an associated phase shifter.

Pursuant to efforts to integrate the circuitry for active arrays, transmit/receive circuits have been implemented in monolithic microwave integrated circuits (MMICs) wherein each transmit/receive circuit is an integrated circuit that includes a phase shifter, a power amplifier, a low noise amplifier, and transmit/receive switches. The main shortcomings of such transmit/receive MMICs include problems in yield, cost, reproducibility, long-term stability, manufacturability, performance, power efficiency, gain, and device matching. Some of the shortcomings are compensated by pre-distorting the phase commands provided to the phase shifters of the transmit/receive MMICs, whereby the relation between phase command and desired phase shift is not linear. This technique, however, requires rigorous characterization of the transmit/receive circuits during manufacture, and the storage of large amounts of calibration data. Moreover, there was the possibility of variations of the MMICs with time and/or temperature that would make the calibration data inaccurate.

SUMMARY OF THE INVENTION

It would therefore be an advantage to provide a MMIC transmit/receive circuit that does not require phase command calibration data.

Another advantage would be to provide a MMIC transmit/receive circuit that has a linearized phase transfer function.

The foregoing and other advantages are provided by the invention in a transmit/receive circuit that includes phase lock loops in the transmit and receive functions for reducing undesired phase variation due to characteristics of the circuitry providing the transmit and receive functions.

BRIEF DESCRIPTION OF THE DRAWINGS

The advantages and features of the disclosed invention will readily be appreciated by persons skilled in the art from the following detailed description when read in conjunction with the drawing wherein:

The FIGURE is a block diagram of a transmit/receive circuit in accordance with the invention.

DETAILED DESCRIPTION OF THE DISCLOSURE

Referring now to the FIGURE, set forth therein is a transmit/receive circuit that includes low power transmit and receive circuitry implemented in a MMIC module 20 and a transmit power amplifier 11 which receives power from a source of DC voltage $V_{DC}$ via a switch 42. The output of the transmit power amplifier 11 is provided to a circulator 13 which is coupled to an associated antenna element 15. The circulator 13 is further connected to receive circuitry in the MMIC module 20. It should be appreciated that depending upon the technology utilized to implement the transmit/receive circuit, the transmit power amplifier 11 may be incorporated into MIMC module 20, instead of existing as a separate element as shown in the FIGURE.

The transmit circuitry of the MMIC module 20 includes a transmit digital phase locked loop (DPLL) that comprises a divide-by-N circuit 23, a phase detector 21, a summing amplifier 25, and a voltage controlled oscillator 29. The phase detector 21 is responsive to a transmit reference frequency $F_r$ and the output of the divide-by-N counter 23. The output of the phase detector 21 is provided to the summing amplifier 25 together with the output of a digital-to-analog converter (DAC) 27. The output of the summing amplifier 25 is provided to the voltage controlled oscillator 29 whose output is provided to a variable gain amplifier 31. The gain of the variable gain amplifier 31 is controlled by the output of a gain control DAC 33. Amplitude control of the transmit signal by the variable gain amplifier 31 controls the antenna spatial sidelobe for doppler radar operation in a clutter environment and to reduce the levels of RF emission in the transmit antenna spatial sidelobes. A transmit mixer 35 receives the output of the variable gain amplifier 31 together with a binary pulse code modulation signal PCM to produce a phase code modulated signal which is provided to the input to the power amplifier 11 via an RF switch 44.

The switch 42 and the RF switch 44 are controlled in parallel by a transmit/receive (T/R) command such that the input to the power amplifier 11 and the DC power to the power amplifier are gated on during transmit intervals and gated off during receive intervals pursuant to the RF switch 44 at the input to the power amplifier and the switch 42 for the DC power to the amplifier, so as to have optimum antenna element power efficiency and to have a design that provides the required isolation between the antenna element transmit and receive functions. Switching off the DC power to the power amplifier during the receive function (1) saves power to the antenna element to increase the antenna element power efficiency, (2) eliminates the generation of power amplifier noise which could enter into the receive path via the circulator 13 and degrade the receiver sensitivity, and (3) insures that the signal at the input of the switch 44, which provides some isolation, will not be amplified by the power amplifier and enter into the receive path via the circulator 13 to degrade radar operation with an undesired signal.

A portion of the output of the transmit amplifier 11 is fed back to a feedback mixer 39 by a directional coupler 37 at the output of the transmit power amplifier 11. The binary pulse code modulation signal PCM provides the other input to the feedback mixer 39 which produces a demodulated version of the output of the directional coupler 37.

The output of the feedback mixer 39 and the output of the variable gain amplifier 31 provide inputs to a pick-off switch 41 whose output is connected to a buffer amplifier 43. The pick-off switch provides a feedback signal to the phase lock loop and is controlled by the T/R command in parallel with the switch 42 and the RF switch 44 so as to commutate between the output of the directional coupler 37 during transmit periods and the CW output of the variable gain amplifier 31 during receive periods, which prevents the phase lock loop from locking and then unlocking with each RF transmit pulse and assures that the transmit DPLL remains locked when power is removed from the power amplifier between transmit intervals or pulses.

In particular, since the signal into power amplifier 11 becomes zero during the receive period if the pick-off switch were not included and the input to the amplifier 43 were provided only by the output of the feedback mixer 39, the DPLL would unlock when the feedback signal disappears and would relock when the feedback reappears at the amplifier 43 at the next RF transmit pulse. During the acquisition period for the DPLL to relock its phase lock loop, the DPLL would experience rapid changes in phase which would cause large amounts phase modulation onto the transmit RF pulse or unwanted intra-pulse phase modulation. Thus, the pick-off switch 41 maintains a feedback signal to the DPLL which adjusts for the phase difference between the two commutated feedback signals which generate negligible intra-pulse phase modulation.

The feedback mixer 39 in the DPLL feedback path minimizes the distortion on the transmitted RF binary phase code modulation since it has the same binary pulse modulation as mixer 35 and thus demodulates the feedback signal to the pick off switch 41 to remove the binary phase modulation from the feedback signal provided to the phase detector 21 in the DPLL. Without mixer feedback mixer 39, the DPLL would attempt to remove any binary phase modulation injected by mixer 35 into the DPLL. If the binary phase modulation has a wider signal bandwidth than the DPLL phase lock loop bandwidth, then the DPLL response would remove the phase modulation. For narrow bandwidth binary phase modulation, the phase shift commands via the DAC 27 could be used to provide the required binary modulation without use of the transmit mixer 35 and the feedback mixer 39.

A data interface and control processor 30 accepts transmit and receive phase and amplitude control data from an array control logic or a beam steering computer, and provides respective digital control words $N_t$, $P_t$, and $A_t$ in accordance with the control data to the divide-by-N counter 23, the phase control DAC 27, and the amplitude control DAC 33.

The phase detector 21 is implemented as an ECL flip-flop detector which operates with a sawtooth transfer function that is linear over a full 360 degree range. The passband of the loop filter of the DPLL, which can be implemented with active low pass filter circuitry in the summing amplifier 25, the VCO 19, and/or the feedback amplifier 43 in accordance with conventional techniques, is selected to accommodate the required chirp bandwidth. In particular, the loop filter passband is selected as a compromise between loop bandwidth (and spurious signal level) and acquisition latency. The active low pass filter circuitry can utilize an on-chip integrated high gain operational amplifier and tuning elements that may be off-chip, particularly for low frequency operation (e.g., L-band) which would require resistors and capacitors too large to be included on-chip.

In the transmit mode, the transmit frequency is determined by the transmit reference frequency $F_t$ and the control word $N_t$ that specifies the N by which the divide-by-N counter 23 divides the input thereto. The transmit frequency is set by the control word $N_t$ and the range of transmit frequencies is determined by the range of $N_t$. In particular, the phase detector 21 is configured to provide an output that tends to maintain a fixed phase relation between the output of the divide-by-N counter output and the transmit reference frequency $F_t$, such that the output of the divide-by-N counter 23 is substantially equal to the transmit reference frequency $F_t$, which requires that the input to the divide-by-N counter 23 be substantially equal to $F_t*N_t$. Since the input to the divide-by-N counter 23 is provided by the buffer amplifier 43 and the input frequency thereof is substantially equal to the output frequency of the variable gain amplifier 31, the power amplifier 11, and the VCO 29, the transmit frequency is $F_t*N_t$. In this manner, the output frequency and phase of the VCO, the variable gain amplifier, and the power amplifier are controlled.

The phase shift of the transmit signal is selected by the control word $P_t$ provided to the DAC 27 which injects a precise DC signal as a phase offset into the phase locked loop at the VCO input. The VCO frequency changes, which causes the phase detector 21 to change its output such that the DPLL locks to the commanded phase. When the DPLL locks to the commanded phase, the VCO frequency will have returned to the frequency determined by the transmit reference frequency $F_t$ and the control word $N_t$ and with the phase determined by the control word $P_t$ via the DAC 27. The DPLL exploits the uniformity of MMIC's to have the antenna elements track each other for the transmit phase settings. Uniformity in the simpler MMIC circuits such as the $F_t$ input path to the phase detector, the phase detector, and the feedback, path with the divide by N 23, buffer amplifier 43, pickoff switch 41, mixer 39 and uniformity in the external coupler 37 are required and achievable. Uniformity in complex MMIC circuits such as the VCO 29 and the variable gain amplifier 31 and in the external power amplifier are not as critical due to the use of a digital phase lock loop. The circulator 13 and the radiator 15, which are passive devices, can be designed to have the uniformity to track each other. This type of phase control is linear, monotonic, and stable, and can be implemented with 8 or more bits of phase control for the DAC 27.

In the transmit circuit, the phase response of the DPLL to the commanded phase will have a response transfer function of $1/(1/G+1)$, where G is the open loop gain in terms of phase output/phase input of the DPLL and the external power amplifier. With sufficient loop gain G, the phase transfer function approaches one and is linearized. By linearizing the phase transfer function, phase variation due to circuit characteristics of the VCO, the variable gain amplifier, and the power amplifier are reduced so that phase variations due to signal level, temperature, manufacturing tolerances, frequency, voltage, and so forth are reduced by a factor of the loop gain. The phase transfer function linearization is also achieved during the transmit mode by including the power amplifier in the phase locked loop during the transmit mode, and therefore the nonlinear phase effects of the power amplifier are reduced by the loop gain, which has the overall effect of linearizing the power amplifier transfer function.

The receive circuitry of the transmit/receive circuit also includes a digital phase locked loop, and includes a phase detector 121 which is responsive to a receive reference frequency $F_r$ and a divide-by-N counter 123. The output of the phase detector 121 is provided to a summing amplifier 125 together with the output of a DAC 127. The output of the summing amplifier 125 is provided to a voltage controlled oscillator 129 whose output is provided to a buffer amplifier 131 and also fed back to a buffer amplifier 143 which provides an input to the divide-by-N counter 123.

A receive mixer 135 receives the output of the buffer amplifier 131 and also the output of a preamplifier 153 which receives the output of the circulator 13 via an RF switch 152 which is controlled by the T/R command signal to be closed during receive intervals and open during transmit intervals. The preamplifier 153 is a variable gain amplifier that is controlled by the output of a gain control DAC 151. Amplitude control of the receive signal by the variable gain low noise preamplifier 153 controls the receive antenna spatial sidelobe for doppler radar operation in a clutter environment and to reduce radar receiver susceptibility to RF radiation in the antenna receive spatial sidelobes. The output of the receive mixer 135 is provided to an intermediate frequency (IF) amplifier 143 which provides the received IF output for received signal processing.

The data interface and control processor 30 provides respective digital control words to divide-by-N counter 123, the DAC 127, and the DAC 151.

The receive circuitry of the transmit/receive circuit provides phase control of the signal received by the antenna element, and provides an IF output that has the proper phase to form the antenna receive beam and beam direction. The receive circuitry includes a digital phase locked loop which functions similarly as the DPLL in the transmit circuitry to control the phase shift on receive. The DPLL provides the local oscillator which shifts its phase under control of DAC 127 for the downconversion of the RF receive signal to the desired IF receive signal. The down conversion process transfers the LO phase shift onto the IF receive phase for proper receive beam formation at IF. Since MMIC low noise preamplifiers 153 can be designed to have small phase shift variation between MMIC's as a function of frequency and temperature, no linearization of the preamplifier 153 with a DPLL will be required.

The foregoing has been a disclosure of a radar transmit/receiver circuit that advantageously provides for linearization of the phase transfer function thereof by the loop gain of a phase locked loop so that phase variations due to signal level, temperature, manufacturing tolerances, frequency, voltage, and so forth, are reduced by a factor of the loop gain. Incorporation in the transmit circuit of a phase locked loop that includes the transmit power amplifier eliminates the need to compensate for the transmit phase shifter and RF power amplifier phase distortion, which is a function of frequency, temperature, and manufacturing procedures. The phase locked loop in the receiver also eliminates the need to compensate for the receive phase shifter. Overall, the phase locked loops also remove the long term phase variation in the phase shifters and the transmit power amplifier. Thus, the invention avoids the need for rigorous characterization of transmit/receive circuits during manufacture and the need to store and utilize large amounts of calibration data, and further avoids the uncertainty of the reliability of calibration data.

The transmit/receiver circuit, which is conveniently implemented in MMIC form, further provides the following features. Down conversion is inherently included as part of the monolithic configuration as a result of the digital phase locked loop which includes baseband mixing as a byproduct of its design. The array bandwidth issue is neatly finessed since the baseband down conversion process is controlled on an element-by-element basis so that a different down conversion process is available for each band of interest. Antenna RF transmit phase noise spectral purity, which is a function of DC power ripple and voltage phase modulation sensitivity of the power amplifier, and the resulting pattern diffusion problems are greatly reduced since the closed loop implementation reduces transmit power amplifier phase noise by the reciprocal of the phase locked loop gain. The loop gain reduces the design task of filtering the DC power within and to the transmit/receive circuit.

Although the foregoing has been a description and illustration of specific embodiments of the invention, various modifications and changes thereto can be made by persons skilled in the art without departing from the scope and spirit of the invention as defined by the following claims.

What is claimed is:

1. A radar transmit circuit for producing a transmit output during transmit time intervals that are interleaved with receive time intervals, comprising:

voltage controlled oscillating means for providing a transmit signal;

transmit mixing means for modulating said transmit signal pursuant to a modulating signal to provide a modulated transmit signal;

power amplifier means responsive to said modulated transmit signal for providing an amplified modulated transmit signal during transmit intervals;

a directional coupler responsive to said power amplifier means for providing a power amplifier feedback output that comprises a portion of said amplified modulated transmit signal;

feedback mixing means for modulating said power amplifier feedback output pursuant to said modulating signal to provide a demodulated power amplifier feedback signal;

divide-by-N means responsive to a feedback signal for dividing the feedback signal by a division ratio N to provide a divide-by-N signal;

phase detection means responsive to a transmit reference signal having a frequency $F_t$ and said divide-by-N signal for providing a phase detection output;

summing means responsive to said phase detection output and a phase control signal for providing a control voltage to said voltage controlled oscillating means;

feedback switching means for providing said feedback signal which comprises (a) said demodulated power amplifier feedback signal during transmit intervals, and (b) the output of said voltage controlled oscillating means during receive intervals, such that said voltage controlled oscillator is controlled by feedback at all times, and whereby the output of said voltage controlled oscillating means has a frequency substantially equal to $N*F_t$ and a phase that is controlled in accordance with the phase control signal.

2. A radar transmit circuit for producing a transmit output during transmit time intervals that are interleaved with receive time intervals comprising:

voltage controlled oscillating means for providing a transmit signal;

power amplifier means responsive to said transmit signal for providing an amplified transmit signal during transmit intervals;

a directional coupler responsive to said power amplifier means for providing a power amplifier feedback output that comprises a portion of said amplified modulated transmit signal;

divide-by-N means responsive to said power amplifier feedback output for dividing the feedback output by a division ratio N to provide a divide-by-N signal;

phase detection means responsive to a transmit reference signal having a frequency $F_t$ and said divide-by-N signal for providing a phase detection output;

summing means responsive to said phase detection output and a phase control signal for providing a control voltage to said voltage controlled oscillating means;

feedback switching means for providing said feedback signal which comprises (a) said demodulated power amplifier feedback signal during transmit intervals, and (b) the output of said voltage controlled oscillating means during receive intervals, such that said voltage controlled oscillator is controlled by feedback at all times, and whereby the output of said voltage controlled oscillating means has a frequency substantially equal to $N*F_t$ and a phase that is controlled in accordance with the phase control signal.

3. A radar receive circuit comprising:

voltage controlled oscillating means for providing a VCO output;

divide-by-N means responsive to said VCO output for dividing the feedback signal by a division ratio N to provide a divide-by-N signal;

phase detection means responsive to a receive reference frequency having a frequency $F_r$ and said divide-by-N signal for providing a phase detection output;

summing means responsive to said phase detection output and a phase control signal for providing a control voltage to said voltage controlled oscillating means, whereby the output of said voltage controlled oscillating means has a frequency substantially equal to $N*F_r$ and a phase that is controlled in accordance with the phase control signal;

receive mixing means responsive to said VCO output and a radar receive signal for providing a down converted radar receive signal.

* * * * *